United States Patent [19]

Matsuo

[11] Patent Number: 4,792,984
[45] Date of Patent: Dec. 20, 1988

[54] RADIO CHANNEL CONTROL METHOD FOR MOBILE COMMUNICATION SYSTEM

[75] Inventor: Yoshitake Matsuo, Tokyo, Japan

[73] Assignee: NEC Corporation, Tokyo, Japan

[21] Appl. No.: 183,341

[22] Filed: Apr. 12, 1988

Related U.S. Application Data

[63] Continuation of Ser. No. 824,332, Jan. 30, 1986, abandoned.

[30] Foreign Application Priority Data

Jan. 31, 1985 [JP] Japan ................................. 60-17369

[51] Int. Cl.⁴ .............................................. H04Q 7/00
[52] U.S. Cl. ........................................ 455/32; 455/33; 455/34; 379/59
[58] Field of Search ...................... 455/32, 33, 34, 38, 455/53, 54, 56, 161, 165, 133–135; 379/58, 59, 63

[56] References Cited

U.S. PATENT DOCUMENTS 3,535,636  10/1970  Muilwijk ............................... 455/32
3,634,627  1/1972   Velentini .............................. 455/34
4,534,061  8/1985   Ulug ..................................... 455/32

FOREIGN PATENT DOCUMENTS 2036347  9/1978  Fed. Rep. of Germany ........ 455/32

Primary Examiner—Robert L. Griffin
Assistant Examiner—Curtis Kuntz
Attorney, Agent, or Firm—Sughrue, Mion, Zinn, Macpeak & Seas

[57] ABSTRACT

A radio channel control method for a narrow-zone mobile communication system in which a plurality of base stations share a plurality of channels and each selects any of the channels for setting up a call independently of the others, e.g. a portable telephone system or a cordless telephone system. Installed in each of all the base stations are transceiver, free to use all the channels, a device capable of indentifying channels on which radio waves have reached the own station based on reception sensitivity, a device for selecting a channel, a device for transmitting a pilot signal and others, and a device for setting up a call. The channel for a pilot signal is adequately changed to shorten a duration of cochannel interference. Connection of multiple base stations to a single mobile station is eliminated by causing each base station to add to the pilot signal identification data which is particular to the base station.

3 Claims, 6 Drawing Sheets

RADIO CHANNEL CONTROL METHOD FOR MOBILE COMMUNICATION SYSTEM

This is a continuation, of application Ser. No. 824,332, filed Jan. 30, 1986, now abandoned.

BACKGROUND OF THE INVENTION

The present invention relates to a mobile radio communication system and, more particularly, to a radio channel control system for a small-zone mobile communication system, e.g. a portable telephone system or a cordless telephone system.

Radio channel control methods known in the mobile communications art may geneally be classified into two types, i.e., a centralized control type in which a base station collectively supervises channels which are assigned to a group of mobile stations associated therewith, and a decentralized control type in which each of mobile stations selects an available channel independently of the others. A personal radio system is one of appications of the decentralized control type method. A domestic maritime mobile radiotelephone system installed by NTT (Japan) is another application which employs a multi-channel cyclic switching principle, i.e., assigns no exclusive common control channels and allows pilot signals to be sent on desired channels.

The channel control for the above-mentioned personal radio system is performed using exclusive common control channels. The problem with such a manner of channel control is that where base stations are so distributed as to provide continuity among different zones as viewed in a plane such as for portable telephones, cochannel interference occurs in overlapping areas of nearby zones where the desired-to-undesired signal (DU) ratio is comparatively low, making it difficult to set up a call. The cochannel interference has customarily been coped with by providing each mobile station with a carrier sensing capability, which allows the mobile station to sense presence/absence of a radio wave.

Meanwhile, the radio channel control elaborated for the domestic maritime mobile radiotelephones assigns different channels to different zones because the zones are each comparatively wide. This successfully eliminates the cochannel interference. However, in a system in which the individual zones are very small such as a portable telephone system or a cordless telephone system, it is significantly difficult to set up a channel arrangement which promotes efficient use of frequencies partly because each zone is not circular but rather linear and partly because base stations cannot be located in adequate places.

SUMMARY OF THE INVENTION

It is therefore an object of the present invention to provide a radio channel control method for a mobile communication system which efficiently uses frequencies and promotes the ease of channel assignment.

It is another object of the present invention to provide a radio channel control method for a mobile communication system which eliminates cochannel interference to allow a call to be set up with ease.

It is another object of the present invention to provide a radio channel control method for a mobile communication system which prevents a plurality of base stations to be connected to a single mobile station.

It is another object of the present invention to provide a generally improved radio channel control method for a mobile communication system.

A radio channel control method for a mobile communication system in which a plurality of base stations share a plurality of channels and each selects any of the channels for setting up a call independently of the other base stations of the present invention comprises the steps of (a) scanning all the channels at a time of channel selection to measure reception field strength of each of the channels and, thereby, to check whether or not an electromagnetic wave is being emitted (carrier sense), (b) selecting one channel out of the channels which show no reception i.e. a channel with no carrier, while excluding the channels which show reception sensitivity, (c) transmitting a pilot signal on the selected channel, and (d) when a signal has not been received over a predetermined period of time over the channel used to transmit the pilot signal, selecting another channel.

In accordance with the present invention, a radio channel control method for a small-zone mobile communication system in which a plurality of base stations share a plurality of channels and each selects any of the channels for setting up a call independently of the others, e.g. a portable telephone system or a cordless telephone system, is disclosed. Installed in each of all the base stations are a transceiver, free to use all the channels, a device capable of identifying channels on which radio waves have reached the own station based on reception sensitivity (i.e. presence or absence of a carrier, a device for selecting a channel, a device for transmitting a pilot signal and others, and a device for setting up a call. The channel for a pilot signal is adequately changed to shorten a duration of cochannel interference. Connection of multiple base stations to a single mobile station is eliminated by causing each base station to add to the pilot signal identification data which is particular to the base station.

The above and other objects, features and advantages of the present invention will become more apparent from the following detailed description taken with the accompanying drawings.

DESCRIPTION OF THE PREFERRED EMBODIMENT

Figure 1:
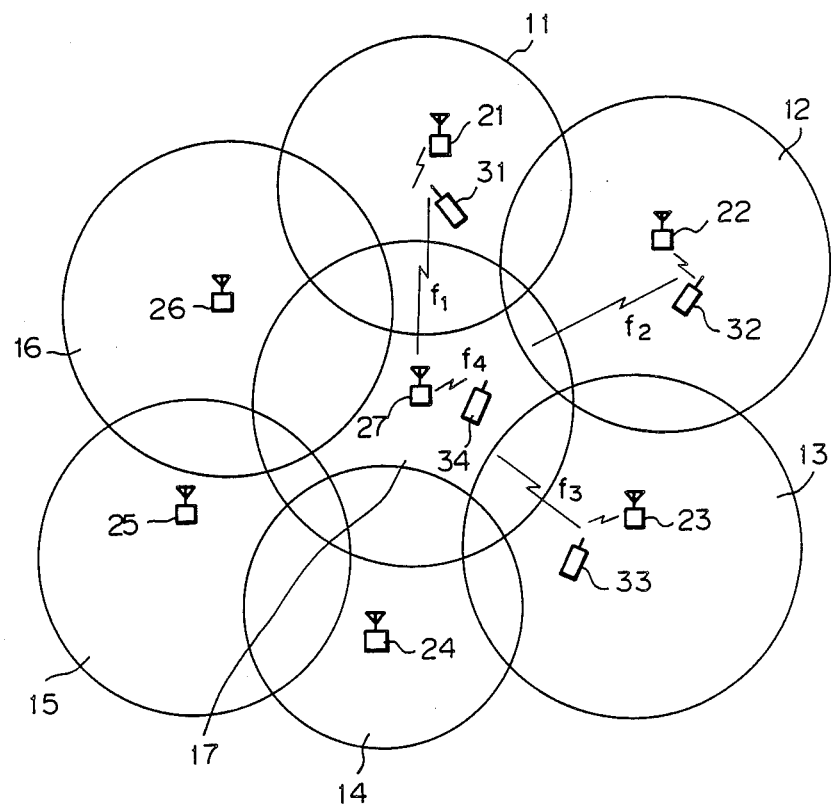
FIG. 1 is a schematic view of a mobile communication system to which the present invention is applicable.

Referring to FIG. 1 of the drawings, a mobile communication system to which the present invention is applicable is shown. As shown, the system includes base stations 21, 22, 23, 24, 25, 26 and 27 which cover radio zones, 11, 12, 13, 14, 15, 16, and 17, respectively. Designated by the reference numerals 31, 32, 33 and 34 are mobile stations, or portable transceivers. FIG. 1 shows for simplicity only seven radio zones and four mobile stations which are in communication.

Figure 2:
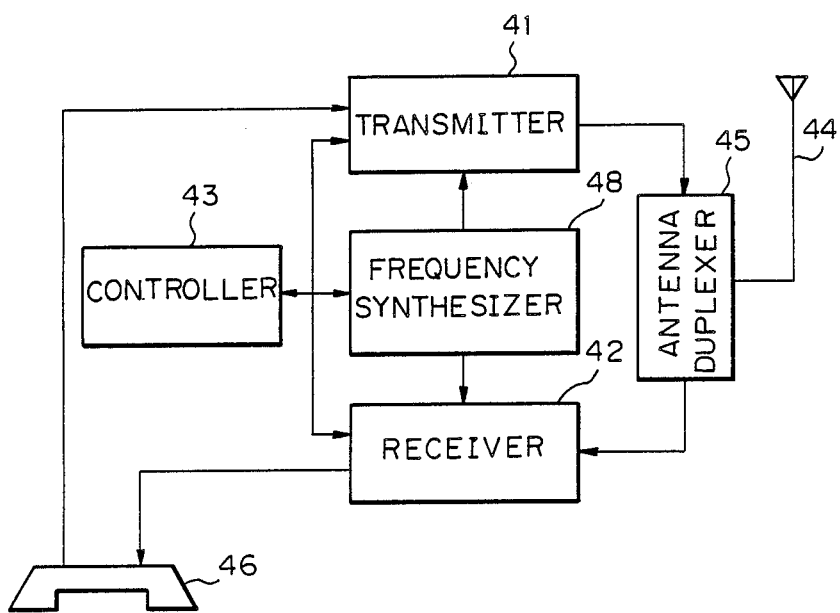
FIG. 2 is a block diagram of a base station included in the system of FIG. 1.
Figure 3:
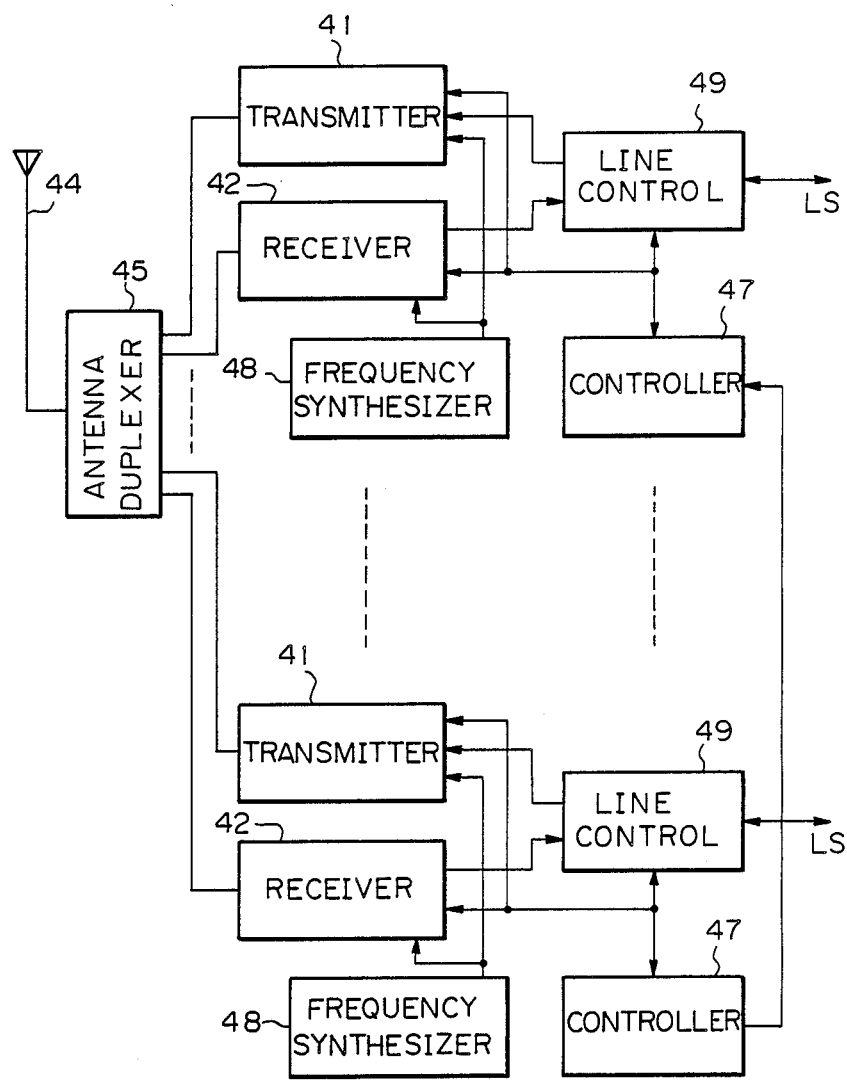
FIG. 3 is a block diagram of a mobile station also included in the system of FIG. 1.

Referring to FIG. 2, each of the mobile stations, like an automobile telephone or a cordless telephone, comprises a transmitter 41, a receiver 42, a controller 43, an antenna 44, an antenna duplexer 45, a handset 46, and a frequency synthesizer capable of being tuned to any desired channel. As shown in FIG. 3, each of the base stations is provided with essentially the same construction as the mobile stations except that it is connected to a public telephone network and, therefore, provided with a line control 49 in place of the handset 46. The line control 49 is connected to a telephone circuit. In each of the base stations and mobile stations, a timer for counting time is usually installed in a controller 47 and is implemented either by software or by hardware. The base stations and mobile stations perform carrier sensing using their receivers 42.

Figure 4:
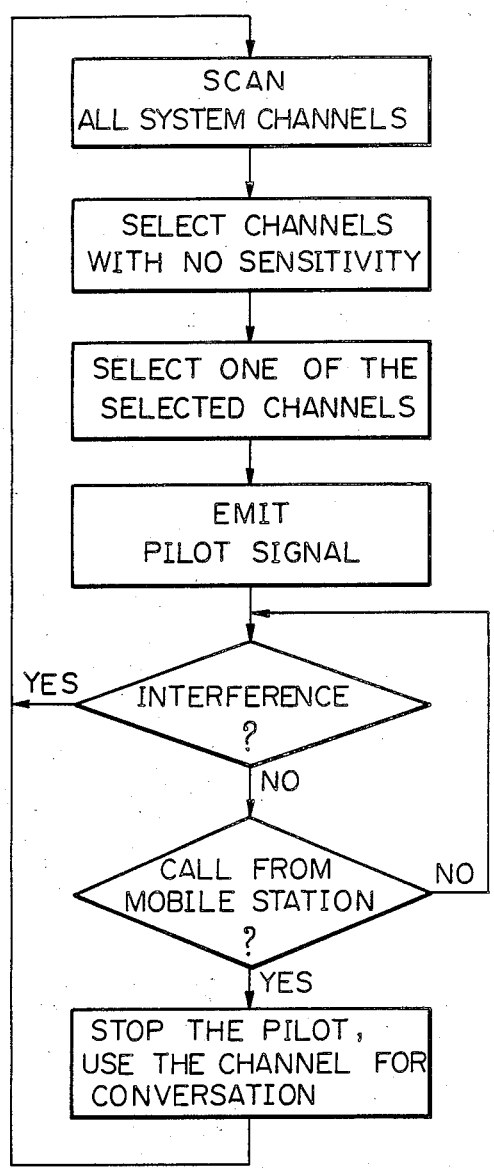
FIG. 4 is a flowchart demonstrating a channel selection procedure performed by the system of FIG. 1.

Referring to FIG. 4, there is shown a flowchart representative of an algorithm with which each base station may select a channel. Specifically, each of the base stations 21-27 shown in FIG. 1 operates as demonstrated by the flowchart in order to allow its associated mobile station to communicate therewith. In the condition shown in FIG. 1, assuming that a radio wave emitted in any one of the seven zones can reach all the other zones as well even if the field intensity may be low, all the base stations need to select channels having frequencies other than $f_1$, $f_2$, $f_3$ and $f_4$. In this illustrative mobile communication system, each base station has the capability for selecting a channel independently of the others so that some of the base stations may possibly select the same channel. The present invention contemplates to settle a problematic situation which will be given rise to by such cochannel interference.

Usually, in the decentralized type control, a base station determines which ones of the channels that are shared by all the base stations are being used by the nearby base stations using a known carrier sense principle, i.e. by checking whether radio waves are received or not. While carrier sense is usually performed in the vicinity of base station, a mobile station is used in locations which are remote from a base station, Hence, perfect carrier sensing is unattainable. In accordance with the method of the present invention, when a predetermined period of time expires before a radio wave is received over a channel which is being used as a control channel, it is decided that a signal is under interception due to interference and the control channel is replaced by another. While a conversation is held, it is impossible to see if interference exists in terms of time only and, hence, another suitable means such as sensing a beat signal is required. In accordance with the present invention, therefore, channel switching is not effected while a conversation is under way.

Figure 5:
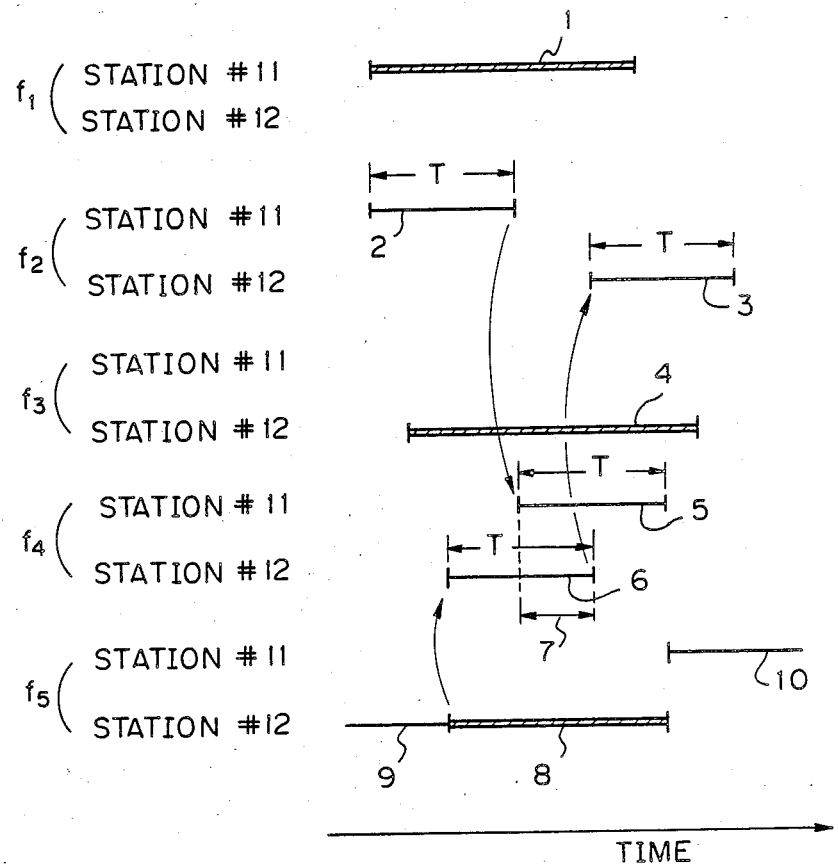
FIG. 5 is a timing chart representative of an exemplary operation in accordance with a radio channel control method of the present invention.

Referring to FIG. 5, there is shown a specific example in which base stations #11 and #12 are provided and to which five channels having frequencies $f_1$–$f_5$ are assigned. The reference numeral 1 designates a duration for which the station #11 uses the channel with the frequency $f_1$ for a conversation; 2, 5 and 10 designate respectively durations for which the station #11 uses the channels with the frequencies $f_2$ and $f_4$ for the transmission of pilot signals; 3, 6 and 9 designate respectively durations for which the station #12 uses the channels with the frequencies $f_2$, $f_4$ and $f_5$ for the transmission of pilot signals; and 4 and 8 designate respectively durations for which the station #12 uses the channels with the frequencies $f_3$ and $f_5$ for conversations. The reference numerals 9 and 8 show a particular situation wherein during transmission of a pilot signal over the channel $f_5$ a signal emitted from a mobile station has arrived on that channel $f_5$ to set up a communication. Further, the reference numeral 7 designates a period of time over which the stations #11 and #12 have selected the same channel (one with the frequency $f_4$) simultaneously to use it for the transmission of pilot signals.

In the above conflicting condition, the method of the present invention causes the station #12 to switch the channel from $f_4$ to $f_2$ upon elapse of a predetermined period of time T. Therefore, the duration of the conflict on the same channel is short enough for a time diversity effect to be achieved.

Figure 6:
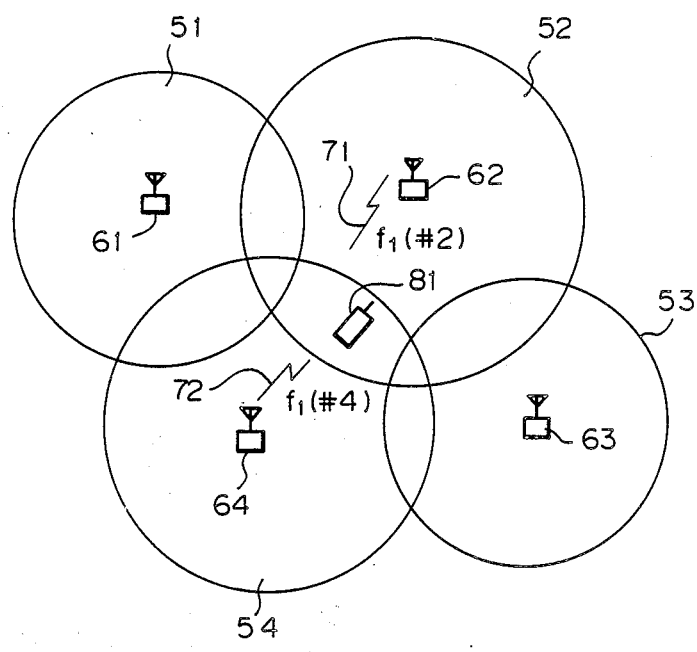
FIG. 6 is a schematic view of a system construction in accordance with the present invention.

Referring to FIG. 6, a system construction in accordance with the present invention is shown. As shown, base stations 61-64 are located in radio zones 51-54, respectively. The reference numerals 71 and 72 each designate a channel whose frequency is $f_1$ and available for the transmission of a pilot signal. Designated by the reference numeral 81 is a mobile station. In the illustrated particular condition, two base stations 62 and 64 are emitting pilot signals at the same time on the same channel (with the frequency $f_1$). As the mobile station 81 in the illustrated location transmits a signal, the two base stations 62 and 64 receive it at the same time. However, since each of the pilot signals contains an identification data, or number, which is particular to the associated base station, the signal from the mobile station 81 is accompanied by the signal received by the own station i.e., #2 or #4. This allows only one of the base stations 62 and 64 to respond to the mobile station 81, that is, prevents the two stations #2 and #4 to connect themselves concurrently to one mobile station 81.

A practical procedure for origination of a call in accordance with the method of the present invention is as follows. A mobile station first tunes itself to a particular control channel which is being activated by a decentralized base station. This particular channel is a one which has a carrier propagating thereover and is modulated by a pilot signal. Then, as the user of the mobile station off-hooks, the mobile station sends a call origination signal to the base station and, after establishment of a loop with the latter, a dial signal. After the base station has connected the calling mobile station to a called station, the user is allowed to hold a conversation with a person at the called station.

Meanwhile, what is necessary for reception of a call is to see where the mobile station is located. In an automobile telephone system or the like, a particular radio zone in which a mobile station is located is usually determined by either one of two approaches: one in which a telephone exchange memorizes a location of the mobile station which is filed, and the other in which all the base stations call up the mobile station at the same time so that one of them may receive a response from the mobile station. Any one of the two approaches is applicable to the present invention. Once the location of the desired mobile station is known, the particular base station may connect the called station to a calling station for a conversation. As previously described in relation to the origination of a call, the mobile station will receive the call while having tuned itself to a channel associated with the particular base station.

In summary, it will be seen that a radio channel control method for a mobile communication system of the present invention achieves various advantages as enumerated below:

(1) The channel for the transmission of a pilot signal is adequately changeable to shorten the duration of cochannel interference;

(2) Simultaneous connection of a plurality of base stations to a single mobile station is eliminated by causing each base station to add identification data particular thereto to a pilot signal; and (3) The above advantages in combination realize a system which is cost-effective, facilitates channel assignment, and promotes efficient use of frequencies.

Various modifications will become possible for those skilled in the art receiving the teachings of the present disclosure without departing from the scope thereof.

What is claimed is:

1. A radio channel control method for a mobile communication system in which a plurality of base stations share a plurality of channels and each selects any of the channels for setting up a call with any of a plurality of mobile stations independently of the other base stations, said radio channel control method comprising the steps of:

(a) at a time of channel selection, scanning at a base station all the channels to measure the reception field strength of each of the channels and, thereby, to check whether or not an electromagnetic wave is being emitted;

(b) selecting at said base station one channel out of the channels which show no reception sensitivity while excluding the channels which show reception sensitivity;

(c) transmitting from said base station to at least one of said mobile stations a pilot signal on the selected channel;

(d) awaiting reception at said at least one mobile station of said pilot signal and, in response to reception of said pilot signal, transmitting from said mobile station on the selected channel a signal for call origination;

(e) awaiting reception at said base station of a call origination signal over said selected channel; and (f) repeating the performance of steps (a), (b), (c), (d) and (e) if, during the predetermined period of time, a correct call origination signal over said selected channel is not received at said base station.

2. A radio channel control method as claimed in claim 1, wherein step (c) comprises (e) adding to the pilot signal identification data representative of the base station.

3. A radio channel control method as claimed in claim 2, further comprising the step of (f) causing the mobile station to send to the base station a signal which is accompanied by the identification signal which is contained in the received pilot signal.

* * * * *